United States Patent
Fackler et al.

(10) Patent No.: US 10,470,245 B2
(45) Date of Patent: Nov. 5, 2019

(54) VARIABLE UPGRADABLE MULTI-USER PORT OF A REMOTE ANTENNA UNIT

(71) Applicant: CommScope Technologies LLC, Hickory, NC (US)

(72) Inventors: Karl-Heinz Fackler, Wemding (DE); Joachim Berndorfer, Königsbrunn (DE); Joerg Stefanik, Donauworth (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/274,921

(22) Filed: Feb. 13, 2019

(65) Prior Publication Data

US 2019/0261455 A1 Aug. 22, 2019

Related U.S. Application Data

(60) Provisional application No. 62/710,473, filed on Feb. 16, 2018.

(51) Int. Cl.
| | |
|---|---|
| *H04M 1/00* | (2006.01) |
| *H04W 88/08* | (2009.01) |
| *H04W 16/20* | (2009.01) |

(52) U.S. Cl.
CPC ......... *H04W 88/085* (2013.01); *H04W 16/20* (2013.01)

(58) Field of Classification Search
CPC ............................ H04W 88/085; H04W 16/20

USPC ...................................................... 455/562.1
See application file for complete search history.

(56) References Cited

U.S. PATENT DOCUMENTS

| | | | |
|---|---|---|---|
| 2003/0048794 A1 | 3/2003 | Sato et al. | |
| 2003/0087672 A1 | 5/2003 | Kattukaran et al. | |
| 2012/0084472 A1 | 4/2012 | Locascio et al. | |
| 2014/0308043 A1* | 10/2014 | Heidler | H04B 10/11 398/115 |
| 2016/0285521 A1* | 9/2016 | Lange | H04B 7/022 |
| 2016/0311410 A1* | 10/2016 | Donzis | G01S 19/13 |

FOREIGN PATENT DOCUMENTS

KR 20130095694 A 8/2013

OTHER PUBLICATIONS

International Searching Authority, "International Search Report and Written Opinion from PCT Application No. PCT/US2019/017844 dated May 24, 2019", from Foreign Counterpart to U.S. Appl. No. 16/274,921, pp. 1-14, Published: WO.

* cited by examiner

*Primary Examiner* — Amancio Gonzalez
(74) *Attorney, Agent, or Firm* — Fogg & Powers LLC

(57) ABSTRACT

A remote antenna unit for a distributed antenna system is provided. The remote antenna unit includes a remote unit processor and a multifunctional port. The remote unit processor is configured to control communication operations of the remote antenna unit. The multifunctional port is configured to interface at least one of communications between at least one component of an extension card and the remote unit controller and power to the extension card.

20 Claims, 6 Drawing Sheets

VARIABLE UPGRADABLE MULTI-USER PORT OF A REMOTE ANTENNA UNIT

CROSS-REFERENCE TO RELATED APPLICATIONS

This application claims benefit of U.S. Provisional Application No. 62/710,473 filed on Feb. 16, 2018, and titled "VARIABLE UPGRADABLE MULTI-USER PORT OF A REMOTE ANTENNA UNIT" the contents of which are incorporated herein in its entirety.

BACKGROUND

Wireless cellular service providers use base stations to implement wireless communication links with user devices, such as mobile phones. In particular, a base station is typically in communication with one or more antennas that receive and transmit radio frequency signals to and from user devices. Each base station in turn is in communication with the service provider's core network. The coverage area of a base station is limited by a range of the transmitting and receiving power of its associated antennas. Moreover, the coverage provided by the transmitted radio waves is influenced by many other factors such as physical obstacles and interference. Hence, wireless coverage in buildings and stadiums has been traditionally poor. One system used by wireless cellular service providers to improve coverage provided by a base station or a group of base stations in problem areas is a distributed antenna system (DAS). A DAS can be placed in or near areas that traditionally do not receive good wireless reception such as in or near buildings and stadiums.

A DAS typically includes one or more master units that are communicatively coupled with a plurality of remote antenna units, where each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can included commercial cellular service and/or private or public safety wireless communications.

Typically, someone installing a remote antenna unit of DAS in the field accesses a communication bus of the remote antenna unit in order to communicate data to or from the remote antenna unit (for example, to upgrade software or firmware for execution on the remote antenna unit and/or to configure the remote antenna unit).

SUMMARY

The following summary is made by way of example and not by way of limitation. It is merely provided to aid the reader in understanding some of the aspects of the subject matter described. In embodiments, remote antenna units include a multifunctional interface that provides variable interchangeable functionality.

In one embodiment, a remote antenna unit for a distributed antenna system is provided. The remote antenna unit includes a remote unit processor and a multifunctional port. The remote unit processor is configured to control communication operations of the remote antenna unit. The multifunctional port is configured to interface at least one of communications between at least one component of an extension card and the remote unit controller and power to the extension card.

In another example embodiment, an extension card for a remote antenna unit of a distributed antenna system is provided. The extension card includes a connection circuit board member, at least one component and at least one extension card contact. The at least one component is used to provide at least one function of the extension card. The at least one component is mounted on the connection circuit board member. The at least one extension card contact is configured and arranged to engage at least one port contact of a multifunctional port of a remote antenna unit when a portion of the connection circuit board member of the extension card is received in the multifunction port of the remote antenna unit. The connection circuit board member provides at least one communication path between each component and at least one extension card contact.

In yet another embodiment, a variable interchangeable function system for a remote antenna unit of a distributed antenna system is provided. The variable interchangeable function system includes a remote antenna unit and an extension card. The remote antenna unit includes a remote unit controller that is configured to control communication operations of the remote antenna unit and a multifunctional port that includes port contacts that are configured to provide at least one of a communication link to the remote unit controller and a power connection. The extension card includes a connection circuit board member, at least one component and an extension card contacts. The at least one component is used to provide at least one function of the extension card. The at least one component is mounted on the connection circuit board member. The extension card contacts are configured and arrange to engage the port contacts of the multifunctional port of the remote antenna unit when a portion of the connection circuit board member of the extension card is received in the multifunction port of the remote antenna unit. The connection circuit board member provides at least one communication path between each component and at least one extension card contact.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a multifunctional interface to a remote antenna unit that may have a direct connection to a controller inside the remote antenna unit. Embodiments allow for the use of various peripherals to communication with the controller. Moreover, embodiments provides the ability to interface future peripherals not anticipated at the initial time of activation of the remote antenna unit.

Figure 1:
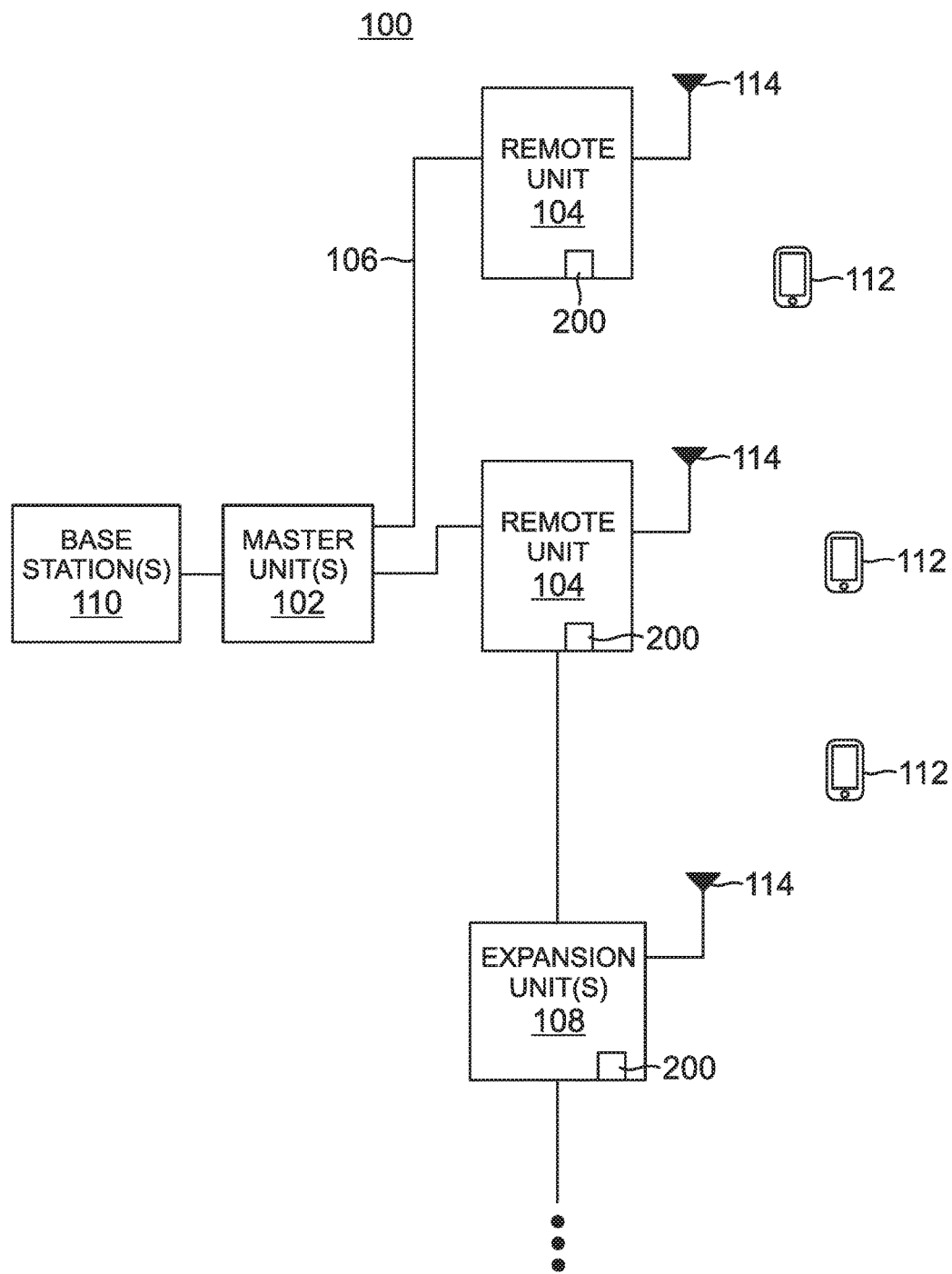
FIG. 1 is a distributed antenna system including remote antenna units with multifunctional ports according to one exemplary embodiment.

An example of a distributed antenna system (DAS) 100 that includes remote units 104 and expansion units 108 with multifunctional interfaces 200 (or multifunctional ports) is illustrated in the block diagram of FIG. 1. The DAS 100 comprises one or more master units 102 that are communicatively coupled to one or more remote units 104 via one or more cables 106. Each remote antenna unit 104 can be communicatively coupled directly to one or more of the master units 102 or indirectly via one or more other remote units 104 and/or via one or more expansion (or other intermediary) unit 108.

Each master unit 102 is communicatively coupled to one or more base stations 110. One or more of the base stations 110 can be co-located with the respective master units 104 to which they are coupled (for example, where each base station 110 is dedicated to providing base station capacity to the system 100 and is coupled to the respective master units 102). Also, one or more of the base stations 110 can be located remotely from the respective master units 102 to which it is coupled (for example, where the base station 110 provides base station capacity to an area beyond the coverage area of the DAS 100). In this latter case, the master unit 102 can be coupled to a donor antenna and repeater or bi-directional amplifier in order to wirelessly communicate with the remotely located base station 110.

The base stations 110 can also be coupled to the master units 102 using a network of attenuators, combiners, splitters, amplifiers, filters, cross-connects, etc., (sometimes referred to collectively as a "point-of-interface" or "POI"). This network can be included in the master units 102 and/or can be separate from the master units 102. This is done so that, in the downlink, the desired set of RF channels output by the base stations 110 can be extracted, combined, and routed to the appropriate master units 102, and so that, in the upstream, the desired set of carriers output by the master units 102 can be extracted, combined, and routed to the appropriate interface of each base station 110. It is to be understood, however, that this is one example and that other embodiments can be implemented in other ways.

In general, each master unit 102 comprises downlink DAS circuitry that is configured to receive one or more downlink signals from one or more base stations 110. Each base station downlink signal includes one or more radio frequency channels used for communicating in the downlink direction with user equipment 112 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol).

The downlink DAS circuitry in each master unit 102 is also configured to generate one or more downlink transport signals derived from one or more base station downlink signals and to transmit one or more downlink transport signals to one or more of the remote units 104.

Each remote unit 104 comprises downlink DAS circuitry that is configured to receive the downlink transport signals transmitted to it from one or more master units 102 and to use the received downlink transport signals to generate one or more downlink radio frequency signals that are radiated from one or more coverage antennas 114 associated with that remote unit 104 and/or expansion unit 108 for reception by user equipment 112. In this way, the DAS 100 increases the coverage area for the downlink capacity provided by the base stations 110.

Also, each remote unit 104 and expansion unit 108 may comprises uplink DAS circuitry that is configured to receive one or more uplink radio frequency signals transmitted from the user equipment 112. These signals are analog radio frequency signals.

The uplink DAS circuitry in each remote antenna unit 104 and expansion unit may also be configured to generate one or more uplink transport signals derived from the one or more remote uplink radio frequency signals and to transmit one or more uplink transport signals to one or more of the master units 102.

Each master unit 102 comprises uplink DAS circuitry that is configured to receive the respective uplink transport signals transmitted to it from one or more remote units 104 and to use the received uplink transport signals to generate one or more base station uplink radio frequency signals that are provided to the one or more base stations 110 associated with that master unit 102. Typically, this involves, among other things, combining or summing uplink signals received from multiple remote units 104 in order to produce the base station signal provided to each base station 110. In this way, the DAS 100 increases the coverage area for the uplink capacity provided by the base stations 110.

Each expansion unit 108 comprises downlink DAS circuitry that is configured to receive the downlink transport signals transmitted to it from the master unit 102 (or other expansion unit 108) and transmits the downlink transport signals to one or more remote units 104 or other downstream expansion units 108. Each expansion unit 108 also comprises uplink DAS circuitry that is configured to receive the respective uplink transport signals transmitted to it from one or more remote units 104 or other downstream expansion units 108, combine or sum the received uplink transport signals, and transmit the combined uplink transport signals upstream to the master unit 102 or other expansion unit 108.

In other embodiments, one or more remote units 104 are coupled to one or more master units 102 via one or more other remote units 104 (for examples, where the remote antenna units 404 are coupled together in a daisy chain or ring topology).

The downlink DAS circuitry and uplink DAS circuitry in each master unit 102, remote antenna unit 104, and expansion unit 108, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry and uplink DAS circuitry may share common circuitry and/or components.

The DAS 100 can use digital transport, analog transport, or combinations of digital and analog transport for generating and communicating the transport signals between the master units 402, the remote units 104, and any expansion units 108.

In such a DAS embodiment, one or more of the master unit 102, the remote antenna unit 104, or the expansion unit 108 can be implemented at least in part using components that are mounted in a rack or sub-rack.

As discussed above, embodiments of the multifunctional interfaces (or multifunctional ports) described here provide flexibility to enable installers of a remote antenna unit to use more sophisticated, modular, and/or upgraded functionality. Example upgraded functionality includes alarm inputs/outputs, connecting external devices with mains supply and bus connection in a remote unit 104. In addition, embodiments of the multifunctional interfaces (or multifunctional ports) described here may further provide a platform to provide flexibility by using modules (extension cards) for mains supply, different frequency bands, different output transmit power levels (that is, modules or cards having power amplifiers rated for different output levels), and different numbers of antenna connectors.

Figure 2:
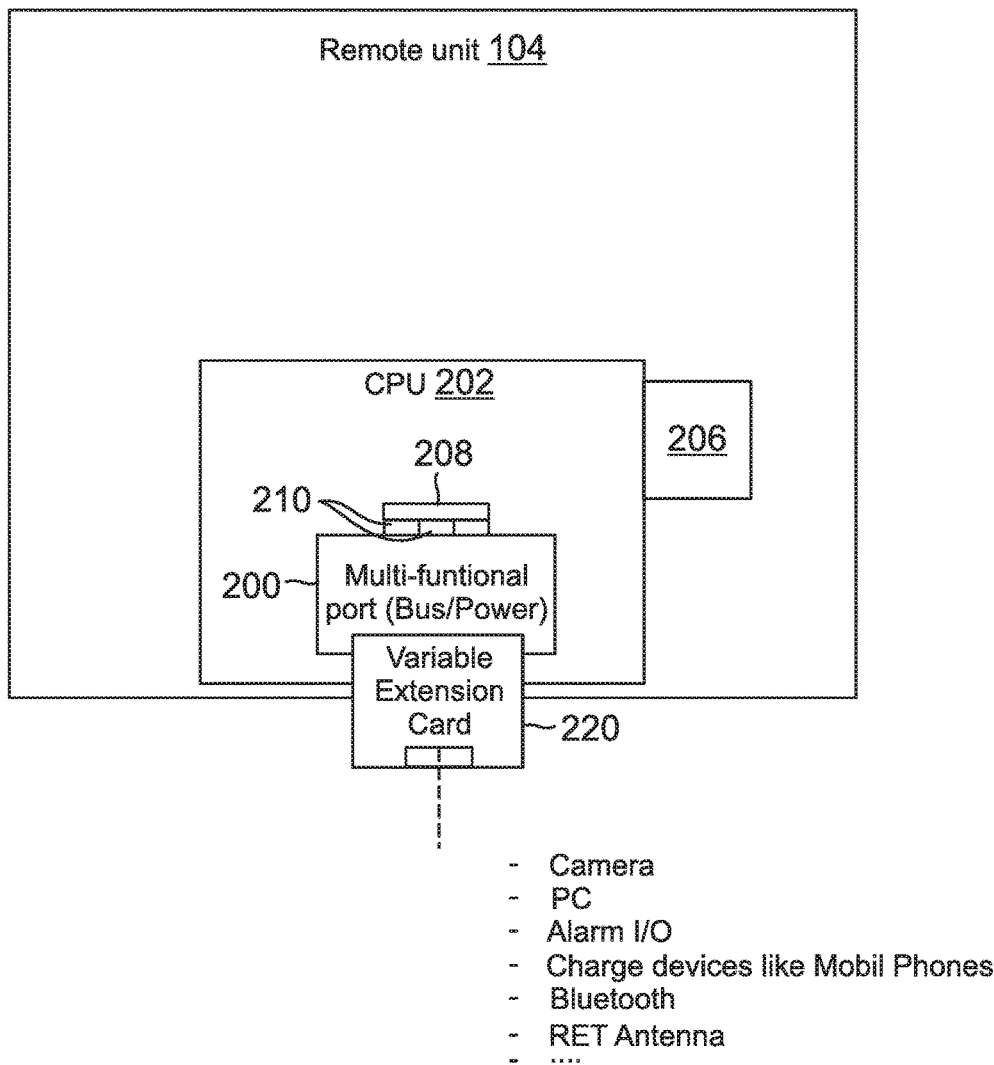
FIG. 2 is a block diagram of a remote antenna unit according to one exemplary embodiment.

Referring to FIG. 2 a block diagram of an example remote antenna unit 104 is illustrated. The remote antenna unit includes a one or more programmable processors 202 (or generally a remote unit controller or processor) that performs and/or controls function of the remote antenna unit 104. The Remote antenna unit 104 may also include a memory 206 to store data and instructions implemented by the remote unit controller 202.

In general, the remote unit controller 202 (or processor) may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the remote unit controller 202 herein may be embodied as software, firmware, hardware or any combination thereof. The remote unit controller 202 may be part of a system controller or a component controller. The memory may include computer-readable operating instructions that, when executed by the controller provides functions of the remote antenna unit 104. Such functions may include the functions of interfacing signals described below. The computer readable instructions may be encoded within the memory 206. Memory 206 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The remote antenna unit 104 further includes a multifunctional port 200 (or multifunctional interface). The multifunctional port 200, in an embodiment, is configured to provide an electrical communication path between at least one component of an extension card (discussed in detail below) and the remote unit processor 202 and to provide an electrical power path to power the at least one component of the extension card. In one embodiment, at least one port contact 210 is communicatively coupled to a communication bus 208 of the remote antenna unit 104 to provide the communication path to the remote processor unit 202. The multifunctional port 200 in embodiments may be used either for customized design or for third party equipment. In one application, a simple and relatively inexpensive interface for external equipment (i.e. Universal Serial Bus (USB) port) is provided to provide basic access to the unit. If a customer has a need for special functionality (for example dry contacts), embodiments provide a customized adapter card that connects to the multifunctional interface as discussed in detail below. Moreover, in some embodiments, the multifunctional port 200 further provides a power interface.

Adaptors or modules, in the form of extension cards 220 may be received in the multifunctional port 200 of the remote antenna unit 104. The extension card 220 may connect directly to the communication bus 208 via port contacts 210. An extension card 220 may provide a variety of analog or digital interfaces for the customer. For example, an extension card 220 may provide an interface for analog or digital inputs or outputs for external alarms, connectors such as dry contacts, sensors, external data transfer, power, camera, a processor, charge devices such as mobile phones, communication system such as Bluetooth, an antenna system such as a Remote Electrical Tilt (RET) antenna, etc. The interfaces can be designed according to customer's requirements.

The multifunctional port 200 provides flexibility with easy upgrades to new upcoming needs. In embodiments, communication between the multifunctional port 200 and the remote unit controller 202 may be accomplished by a wired medium, wirelessly, optically or by a direct connected via bus 208 illustrated in FIG. 2. Moreover, a physical location of the multifunctional port 200 can be located in any location to in relation to the remote antenna unit including being directly fixed with front plate or positioned beside a remote antenna unit.

Figure 3:
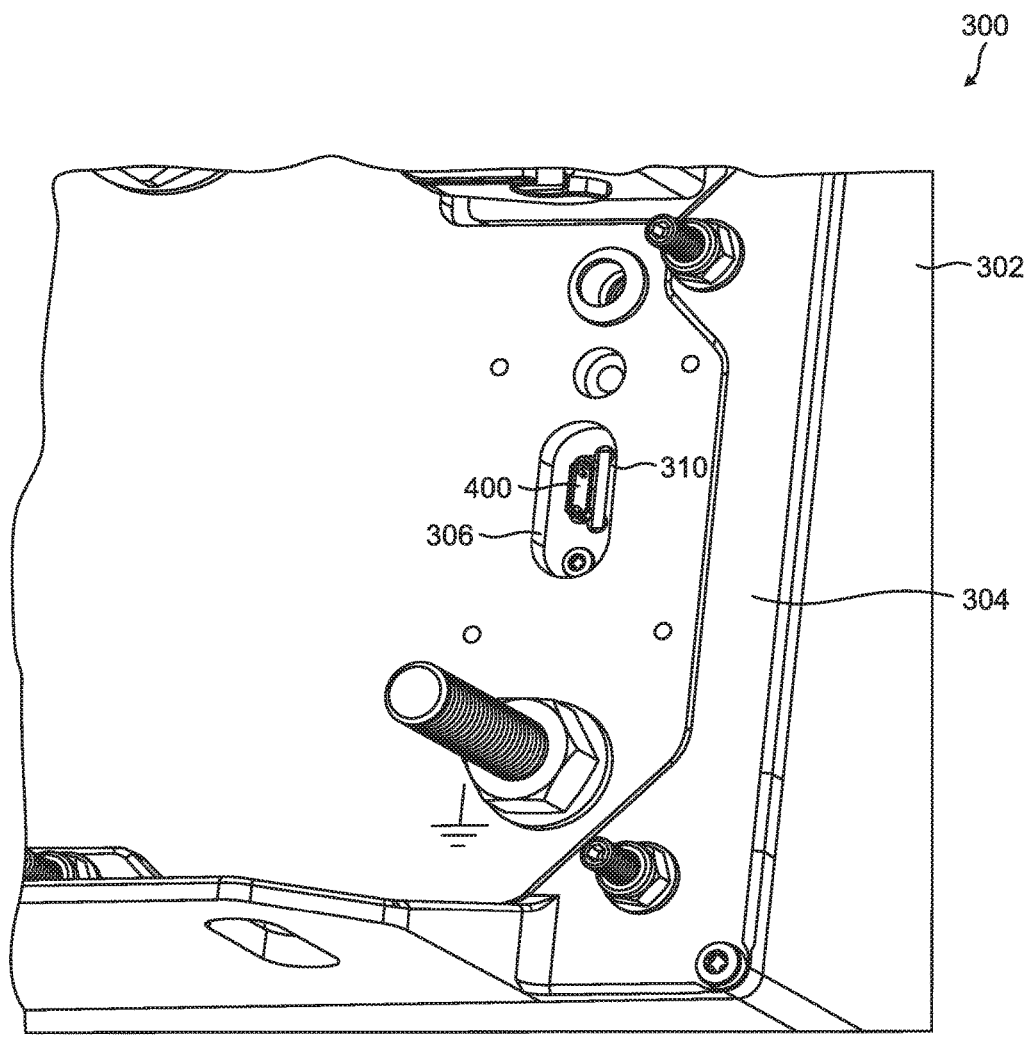
FIG. 3 is a close-up partial front perspective view of a remote antenna unit and example extension card according to one exemplary embodiment.

Referring to FIG. 3, a portion of a remote antenna unit 300 having a multifunctional port 310 is illustrated. The remote antenna unit 300 is illustrated as having a housing 302 and a cover 304. In this embodiment, access to the multifunctional port 310 is provided through a passage 306 in the cover 304. A standard extension card 400 is illustrated as being inserted in the multifunctional port 310 in this example embodiment shown in FIG. 3.

Figure 4:
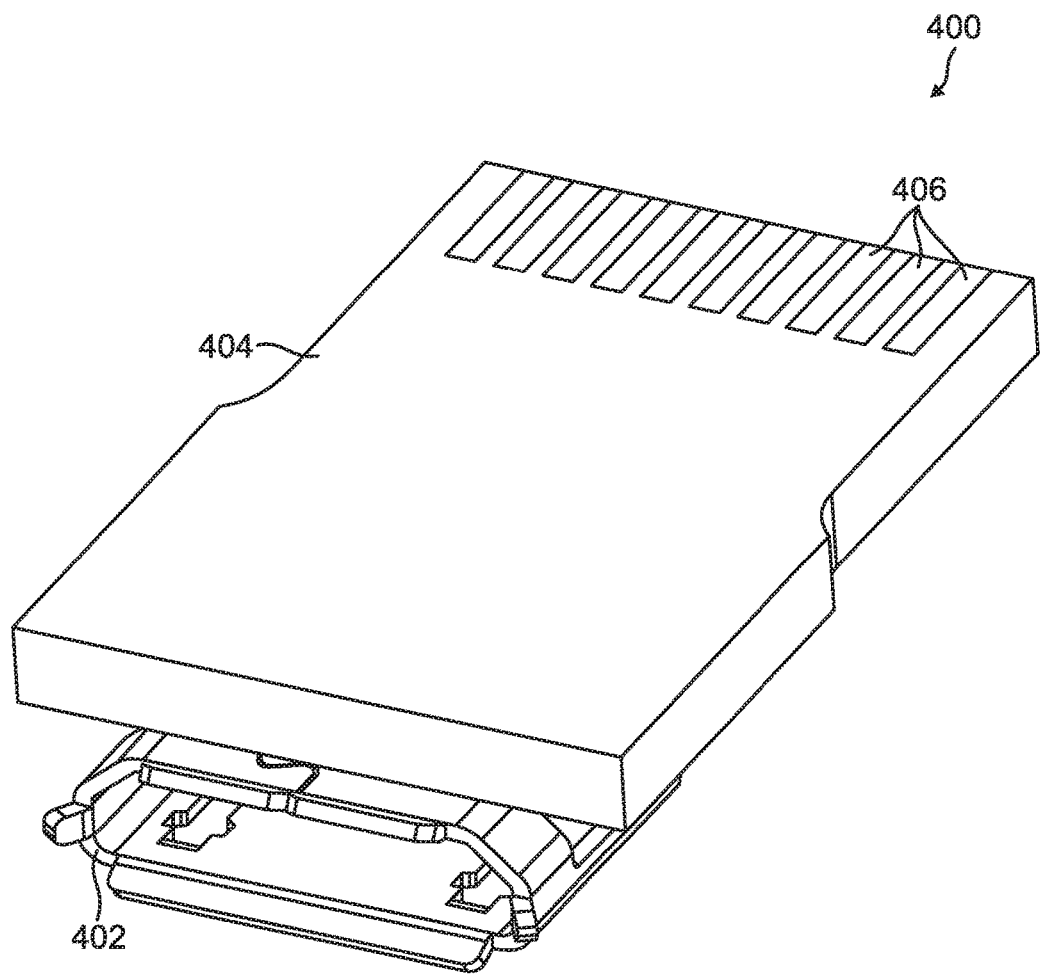
FIG. 4 is a front perspective view of the example extension card of FIG. 3.

FIG. 4 illustrates the standard extension card 400 of an embodiment. The standard extension card 400 includes cost optimized functions such a standard USB connection port 402. The USB connection port 402 is communicatively coupled to extension card contacts 406 of connection circuit board member 404. The extension card contacts 406 are communicatively coupled with associated port contacts (such as port contact 210 of FIG. 2) in the multifunctional port 310 when the extension card 400 is received within the port 310. The contacts 210 in the multifunctional port 310 in turn are communicatively coupled to a remote unit controller such as remote unit controller 202 discussed above in regards to FIG. 2.

Figure 5:
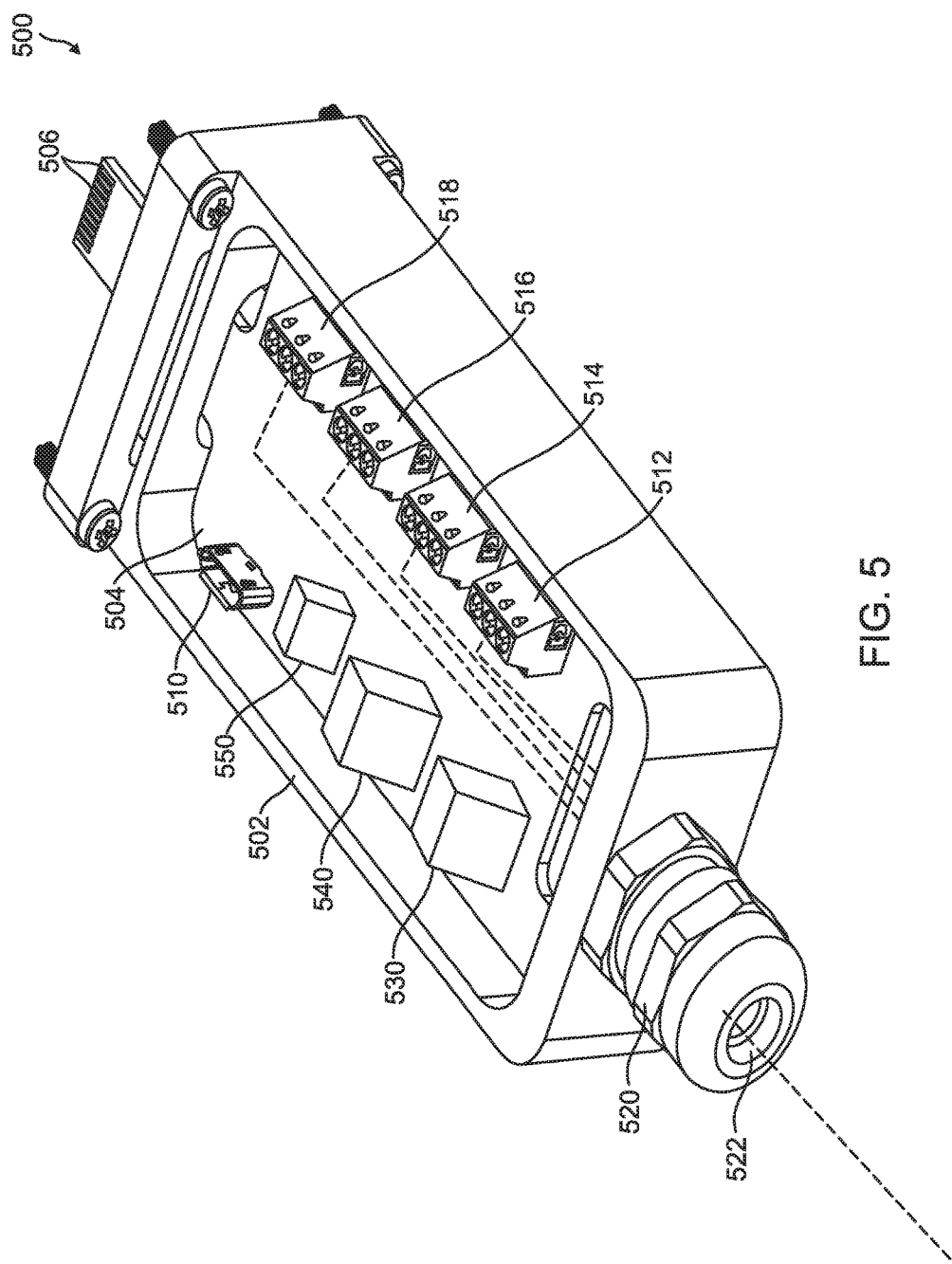
FIG. 5 is a front perspective view of another example extension card according to one exemplary embodiment.

FIG. 5 illustrates a customized extension card 500 of an example embodiment. This example extension card 500 includes a housing 502. Within the housing 502 is a connection circuit board member 504 that provides a communication contact between respective connectors 512, 514, 516 and 518 and extension card contacts 506. Connector 510 in this embodiment is a USB connection port 510. Connectors 512, 514, 516 and 518 are other types of connectors with different types of interfaces. The extension card 500 example further includes a holding collar 520 with a passage 522 that leads to the connectors 512, 514, 516 and 518 within the housing 502. An elongated communication member such as an external communication cord or the like is passed though the holding collar to a select connector 512, 514, 516 and 518 as indicated by the dashed lines in FIG. 5. The holding collar 520 is configured to selectively hold the communication cord in place in relation to the housing 502.

Figure 6:
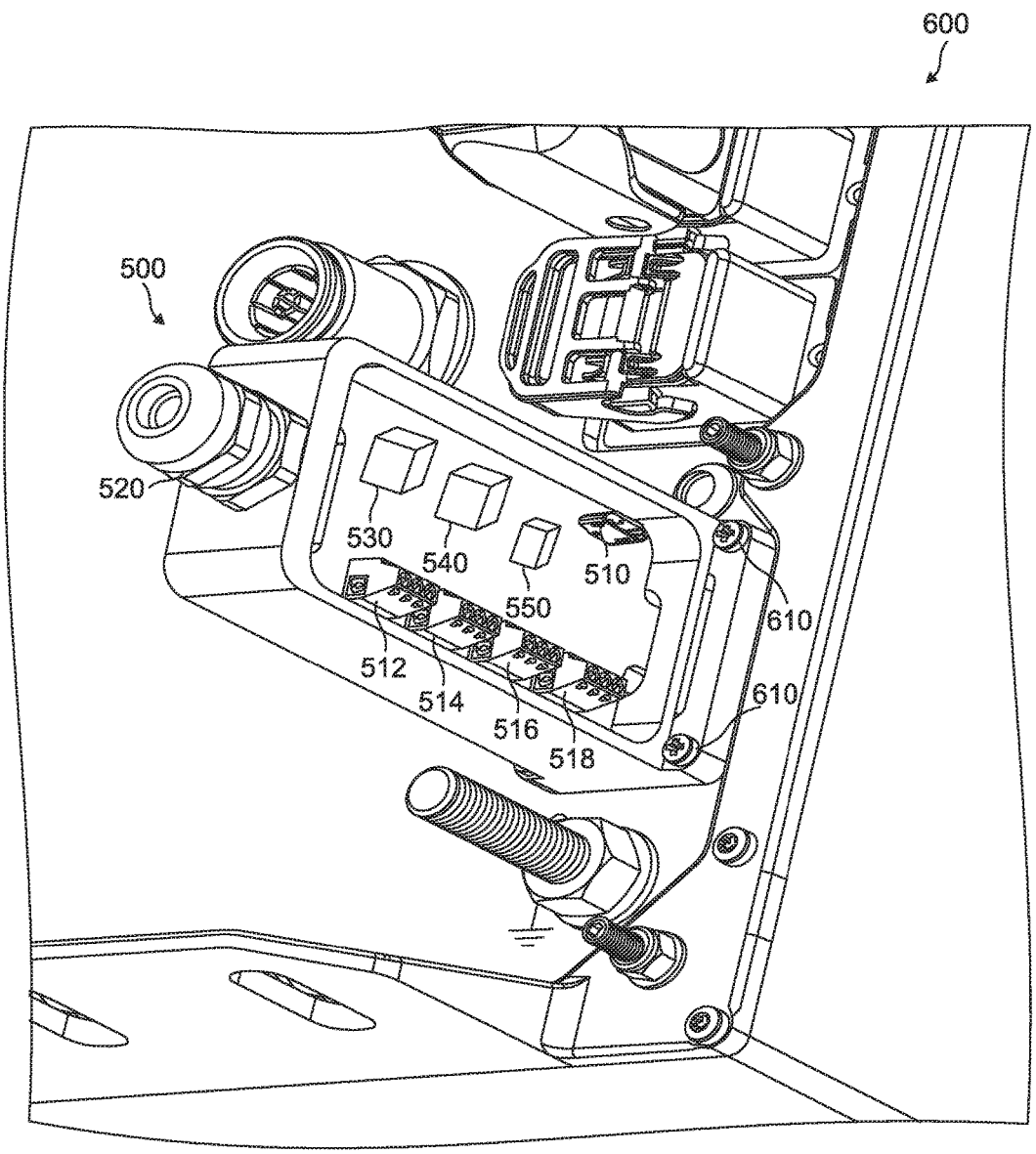
FIG. 6 is a close-up partial front perspective view of a remote antenna unit and the example extension card of FIG. 5.

The example extension card 500 is further illustrated as including a sensor 530, such as, but not limited to, a temperature sensor, a wind sensor, a smoke detector sensor and a wireless communication module 540. Further, extension card 500 is illustrated as including a micro controller 550 (or extension card processor or controller) that provides a communication interface between the remote unit controller and various interfaces towards the customer side. In an embodiment, a cover (not shown) may be used to cover the housing 502 to protect the components and connection circuit board member 504. Referring to FIG. 6, the extension card 500 received in a multifunctional port of a remote antenna unit 600. In this embodiment, the extension card 500 is secured to a cover 602 of the remote antenna unit 600 via fasteners 610.

Example Embodiments

Example 1 is a remote antenna unit for a distributed antenna system. The remote antenna unit includes a remote unit processor and a multifunctional port. The remote unit processor is configured to control communication operations of the remote antenna unit. The multifunctional port is configured to interface at least one of communications between at least one component of an extension card and the remote unit controller and power to the extension card.

Example 2, includes the remote antenna unit for a distributed antenna system of Example 1, wherein the multifunctional port includes a circuit that configured to establish an electrical communication path between the at least one component of the extension card and the remote unit processor and an electrical power path to provide power to the extension card. The multifunctional port further includes a least one connector that is configured to establish electrical connections with a corresponding at least one connector of the extension card when the extension card is installed into the remote antenna unit.

Example 3 includes the remote antenna unit for a distributed antenna system of any of the Examples 1-2, wherein the multifunctional port includes port contacts that are configured and arranged to engage the extension card contacts of the extension card.

Example 4 includes the remote antenna unit for a distributed antenna system of any of the Examples 1-3, wherein the multifunctional port is one of a standard communication port and a customized communication port.

Example 5 includes the remote antenna unit for a distributed antenna system of any of the Examples 1-4, wherein the at least one component is at least one of a sensor, a camera, an alarm, a wireless communication module, an antenna, charging port, an extension card processor and a connector.

Example 6 includes the remote antenna unit for a distributed antenna system of any of the Examples 1-5, wherein the remote antenna unit includes a bus. The multifunctional port is in communication with the bus.

Example 7 includes the remote antenna unit for a distributed antenna system of any of the Examples 1-6, wherein the multifunctional port provides one of analog and digital interfaces.

Example 8 is an extension card for a remote antenna unit of a distributed antenna system. The extension card includes a connection circuit board member, at least one component and at least one extension card contact. The at least one component is used to provide at least one function of the extension card. The at least one component is mounted on the connection circuit board member. The at least one extension card contact is configured and arranged to engage at least one port contact of a multifunctional port of a remote antenna unit when a portion of the connection circuit board member of the extension card is received in the multifunction port of the remote antenna unit. The connection circuit board member provides at least one communication path between each component and at least one extension card contact.

Example 9 is an extension card for a remote antenna unit of a distributed antenna system of Example 8, wherein the at least one component includes a card controller configured to control at least in part operations of the extension card. The card controller in communication with a remote unit controller when the portion of the connection circuit board member of the extension card is received in the multifunction port of the remote antenna unit.

Example 10 is an extension card for a remote antenna unit of a distributed antenna system of any of the Examples 8-9, wherein the at least one component includes a universal serial bus connection port.

Example 11 is an extension card for a remote antenna unit of a distributed antenna system of any of the Examples 8-10, wherein the at least one component provides a connection to a power source when the portion of the connection circuit board member of the extension card is received in the multifunction port of the remote antenna unit.

Example 12 is an extension card for a remote antenna unit of a distributed antenna system of any of the Examples 8-11, wherein the at least one component is at least one of an alarm, a sensor, a connector, a data transfer device, a camera, a communication system and an antenna system.

Example 13 is an extension card for a remote antenna unit of a distributed antenna system of any of the Examples 8-12, further including a housing to receive at least a portion of the connection circuit board member and the at least one component.

Example 14 is an extension card for a remote antenna unit of a distributed antenna system of Example 13, further including a holding collar coupled to the housing. The holding collar having a holding collar passage that leads into the housing. The holding collar configured to selectively hold an elongated communication member passing the holding collar passage.

Example 15 is a variable interchangeable function system for a remote antenna unit of a distributed antenna system. The variable interchangeable function system includes a remote antenna unit and an extension card. The remote antenna unit includes a remote unit controller that is configured to control communication operations of the remote antenna unit and a multifunctional port that includes port contacts that are configured to provide at least one of a communication link to the remote unit controller and a power connection. The extension card includes a connection circuit board member, at least one component and an extension card contacts. The at least one component is used to provide at least one function of the extension card. The at least one component is mounted on the connection circuit board member. The extension card contacts are configured and arrange to engage the port contacts of the multifunctional port of the remote antenna unit when a portion of the connection circuit board member of the extension card is received in the multifunction port of the remote antenna unit. The connection circuit board member provides at least one communication path between each component and at least one extension card contact.

Example 16 is a variable interchangeable function system of Example 15, wherein the at least one component of the extension card includes a card controller that is configured to control at least in part operations of the extension card. The card controller is in communication with the remote unit controller when the portion of the connection circuit board member of the extension card is received in the multifunction port of the remote antenna unit.

Example 17 is a variable interchangeable function system of any of the Examples 15-16, wherein the at least one component of the extension card includes a universal serial bus connection port.

Example 18 is a variable interchangeable function system of any of the Examples 15-17, wherein the at least one component of the extension card is at least one of an alarm, a sensor, a connector, a data transfer device, a camera, a communication system and an antenna system.

Example 19 is a variable interchangeable function system of any of the Examples 15-18, wherein the extension card includes a housing to receive at least a portion of the connection circuit board member and the at least one component.

Example 20 is a variable interchangeable function system of Example 19, wherein the extension card further includes a holding collar that is coupled to the housing. The holding collar has a holding collar passage that leads into the housing. The holding collar is configured to selectively hold an elongated communication member passing the holding collar passage.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A remote antenna unit for a distributed antenna system comprising:
   a remote unit processor configured to control operations of the remote antenna unit; and
   a multifunctional port, the multifunctional port configured to interface at least one of communications between at least one component of an extension card and the remote unit controller and power to the extension card.

2. The remote antenna unit for a distribution antenna system of claim 1, wherein the multifunctional port comprises:
   a circuit configured to establish,
      an electrical communication path between the at least one component of the extension card and the remote unit processor, and
      an electrical power path to provide power to the extension card; and
   a least one connector configured to establish electrical connections with a corresponding at least one connector of the extension card when the extension card is installed into the remote antenna unit.

3. The remote antenna unit for a distribution antenna system of claim 2, wherein the at least one connector includes port contacts that are configured and arranged to engage extension card contacts of the extension card.

4. The remote antenna unit for a distribution antenna system of claim 1, wherein the multifunctional port is one of a standard communication port and a customized communication port.

5. The remote antenna unit for a distribution antenna system of claim 1, wherein the at least one component is at least one of a sensor, a camera, an alarm, a wireless communication module, an antenna, charging port, an extension card processor and connectors.

6. The remote antenna unit for a distribution antenna system of claim 1, wherein the remote antenna unit includes a bus, the multifunctional port in communication with the bus.

7. The remote antenna unit for a distribution antenna system of claim 1, wherein the multifunctional port provides one of analog and digital interfaces.

8. An extension card for a remote antenna unit of a distributed antenna system comprising:
   a connection circuit board member;
   at least one component to provide at least one function of the extension card, the at least one component mounted on the connection circuit board member; and
   at least one extension card contact configured and arranged to engage at least one port contact of a multifunctional port of a remote antenna unit when a portion of the connection circuit board member of the extension card is received in the multifunction port of the remote antenna unit, the connection circuit board member providing at least one communication path between each component and at least one extension card contact.

9. The extension card for a remote antenna unit of a distributed antenna system of claim 8, wherein the at least one component includes a card controller configured to control at least in part operations of the extension card, the card controller in communication with a remote unit controller when the portion of the connection circuit board member of the extension card is received in the multifunction port of the remote antenna unit.

10. The extension card for a remote antenna unit of a distributed antenna system of claim 8, wherein the at least one component includes a universal serial bus connection port.

11. The extension card for a remote antenna unit of a distributed antenna system of claim 8, wherein the at least one component provides a connection to a power source when the portion of the connection circuit board member of the extension card is received in the multifunction port of the remote antenna unit.

12. The extension card for a remote antenna unit of a distributed antenna system of claim 8, wherein the at least one component is at least one of an alarm, a sensor, a connector, a data transfer device, a camera, a communication system and an antenna system.

13. The extension card for a remote antenna unit of a distributed antenna system of claim 8, further comprising:
   a housing to receive at least a portion of the connection circuit board member and the at least one component.

14. The extension card for a remote antenna unit of a distributed antenna system of claim 13, further comprising:
   a holding collar coupled to the housing, the holding collar having a holding collar passage that leads into the housing, the holding collar configured to selectively hold an elongated communication member passing the holding collar passage.

15. A variable interchangeable function system for a remote antenna unit of a distributed antenna system, the variable interchangeable function system comprising:
- a remote antenna unit including,
  - a remote unit controller configured to control communication operations of the remote antenna unit, and
  - a multifunctional port including port contacts configured to provide at least one of a communication link to the remote unit controller and a power connection; and
- an extension card including,
  - a connection circuit board member;
  - at least one component to provide at least one function of the extension card, the at least one component mounted on the connection circuit board member, and
  - extension card contacts configured and arrange to engage the port contacts of the multifunctional port of the remote antenna unit when a portion of the connection circuit board member of the extension card is received in the multifunction port of the remote antenna unit, the connection circuit board member providing at least one communication path between each component and at least one extension card contact.

16. The variable interchangeable function system of claim 15, wherein the at least one component of the extension card includes a card controller configured to control at least in part operations of the extension card, the card controller in communication with the remote unit controller when the portion of the connection circuit board member of the extension card is received in the multifunction port of the remote antenna unit.

17. The variable interchangeable function system of claim 15, wherein the at least one component of the extension card includes a universal serial bus connection port.

18. The variable interchangeable function system of claim 15, wherein the at least one component of the extension card is at least one of an alarm, a sensor, a connector, a data transfer device, a camera, a communication system and an antenna system.

19. The variable interchangeable function system of claim 15, wherein the extension card includes a housing to receive at least a portion of the connection circuit board member and the at least one component.

20. The variable interchangeable function system of claim 19, wherein the extension card further includes a holding collar that is coupled to the housing, the holding collar having a holding collar passage that leads into the housing, the holding collar configured to selectively hold an elongated communication member passing the holding collar passage.

* * * * *